United States Patent
Condello et al.

(10) Patent No.: US 9,353,290 B2
(45) Date of Patent: May 31, 2016

(54) TRANSFIX SURFACE MEMBER COATING

(71) Applicant: XEROX CORPORATION, Norwalk, CT (US)

(72) Inventors: Anthony S. Condello, Webster, NY (US); Chu-Heng Liu, Penfield, NY (US); David J. Gervasi, Pittsford, NY (US); Jeffrey Folkins, Rochester, NY (US); Santokh S. Badesha, Pittsford, NY (US); Mandakini Kanungo, Penfield, NY (US); Palghat Ramesh, Pittsford, NY (US); Paul McConville, Webster, NY (US); Phillip Wantuck, Rochester, NY (US); Lifeng Chen, Findlay, OH (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/250,482

(22) Filed: Apr. 11, 2014

(65) Prior Publication Data
US 2015/0291847 A1    Oct. 15, 2015

(51) Int. Cl.
| C09D 183/10 | (2006.01) |
| B41J 2/005 | (2006.01) |
| B41J 11/00 | (2006.01) |
| B41J 2/01 | (2006.01) |

(52) U.S. Cl.
CPC ........... *C09D 183/10* (2013.01); *B41J 2/01* (2013.01); *B41J 2002/012* (2013.01)

(58) Field of Classification Search
CPC ........ B41J 2/0057; B41J 2/01; B41J 2/17593; B41J 29/17; B41J 2002/012
USPC ................................................. 347/102, 103
See application file for complete search history.

(56) References Cited

U.S. PATENT DOCUMENTS

| 7,608,325 | B2 | 10/2009 | Rasch et al. |
| 8,247,066 | B2 | 8/2012 | Wu |
| 2005/0018027 | A1* | 1/2005 | Pan et al. ............... 347/103 |

(Continued)

OTHER PUBLICATIONS

Author Unknown, "Chemical reactions of the "finished" silicone", Silicones Europe, http://www.silicones.eu/science-research/chemistry/chemical-reactions-on-the-finished-silicone, accessed Dec. 13, 2014, pp. 1-4.

*Primary Examiner* — Manish S Shah
*Assistant Examiner* — Roger W Pisha, II
(74) *Attorney, Agent, or Firm* — MH2 Technology Law Group, LLP

(57) ABSTRACT

An embodiment of the present disclosure is directed to an indirect printing apparatus. The indirect printing apparatus comprises an intermediate transfer member comprising a substrate and a surface layer disposed over the substrate. The surface layer comprises a fluoroelastomer-aminosilane grafted polymer and infrared absorptive filler materials. The indirect printing apparatus also comprises a coating mechanism for forming a sacrificial coating onto the intermediate transfer member and a drying station for drying the sacrificial coating. At least one inkjet nozzle is positioned proximate the intermediate transfer member and configured for jetting ink droplets onto the sacrificial coating formed on the intermediate transfer member. An ink processing station comprises a radiation source for at least partially drying the ink on the sacrificial coating formed on the intermediate transfer member. The indirect printing apparatus also comprises a substrate transfer mechanism for moving a substrate into contact with the intermediate transfer member.

13 Claims, 3 Drawing Sheets

(56) References Cited

U.S. PATENT DOCUMENTS

| | | | |
|---|---|---|---|
| 2007/0207186 A1* | 9/2007 | Scanlon et al. | 424/424 |
| 2009/0237479 A1* | 9/2009 | Yamashita et al. | 347/103 |
| 2011/0018925 A1* | 1/2011 | Ohara | 347/16 |
| 2012/0103212 A1 | 5/2012 | Stowe et al. | |
| 2012/0301818 A1 | 11/2012 | Gilmartin et al. | |
| 2014/0060352 A1 | 3/2014 | Gervasi et al. | |
| 2014/0060357 A1 | 3/2014 | Hsieh | |
| 2014/0060359 A1 | 3/2014 | Kanungo et al. | |
| 2014/0060360 A1 | 3/2014 | Moorlag et al. | |
| 2014/0060361 A1 | 3/2014 | Gervasi et al. | |
| 2014/0060363 A1 | 3/2014 | Kelly et al. | |
| 2014/0060365 A1* | 3/2014 | Gervasi et al. | 101/451 |

* cited by examiner

TRANSFIX SURFACE MEMBER COATING

FIELD OF THE DISCLOSURE

The present teachings relate to printers and, more particularly, to a transfix surface member for use in an aqueous transfix printer.

BACKGROUND

In indirect aqueous printing, an aqueous ink is jetted onto an intermediate imaging surface, referred to herein as a transfix surface member. The ink is partially dried on the transfix surface member prior to transfixing the image to a print medium, such as a sheet of paper.

As it is important not to disturb the semi-wet ink, non-contact heating is employed to dry the ink. The non-contact heating may be radiant or convection heating; however, convection heating alone may be impractical due to size, cost, and noise.

Radiant heat, while fast acting and effective, is not color blind. Depending on the ink & blanket colors as well as the radiant source wavelengths, significant differences in image temperature may occur. This problem was realized when two blankets with the same fluoroelastomer top coating were tested for two different color substrates. The colors were shown to have very different semi-wet ink temperatures. Specifically, a blue (more reflective) substrate promoted the black ink to heat up much more than the cyan & magenta. A gray (more absorbing) under layer helped to heat the inks more uniformly but was less efficient since it began to heat the bulk of the blanket unnecessarily.

Therefore, techniques for equalizing ink temperature while maintaining thermal efficiency would be desirable in the art.

SUMMARY

An embodiment of the present disclosure is directed to an indirect printing apparatus. The indirect printing apparatus comprises an intermediate transfer member comprising a substrate and a surface layer disposed over the substrate. The surface layer comprises a fluoroelastomer-aminosilane grafted polymer and infrared absorptive filler materials. The indirect printing apparatus also comprises a coating mechanism for forming a sacrificial coating onto the intermediate transfer member and a drying station for drying the sacrificial coating. At least one inkjet nozzle is positioned proximate the intermediate transfer member and configured for jetting ink droplets onto the sacrificial coating formed on the intermediate transfer member. An ink processing station comprises a radiation source for at least partially drying the ink on the sacrificial coating formed on the intermediate transfer member. The indirect printing apparatus also comprises a substrate transfer mechanism for moving a substrate into contact with the intermediate transfer member.

Another embodiment of the present disclosure is directed to a transfix surface member for use in aqueous ink jet printer. The transfix surface member comprises a substrate and a surface layer disposed over the substrate. The surface layer comprises a fluoroelastomer-aminosilane grafted polymer and an infrared absorptive filler material.

Yet another embodiment of the present disclosure is directed to an indirect printing process. The process comprises providing an ink composition in an inkjet printing apparatus. A sacrificial coating is formed onto an intermediate transfer member, the intermediate transfer member comprising a substrate and a surface layer disposed over the substrate. The surface layer comprises a fluoroelastomer-aminosilane grafted polymer and an infrared absorptive filler material. Droplets of ink are ejected in an imagewise pattern onto the sacrificial coating. The intermediate transfer member is radiated to at least partially dry the ink and form a substantially dry ink pattern on the intermediate transfer member. Both the substantially dry ink pattern and the sacrificial coating are transferred from the intermediate transfer member to a final substrate.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
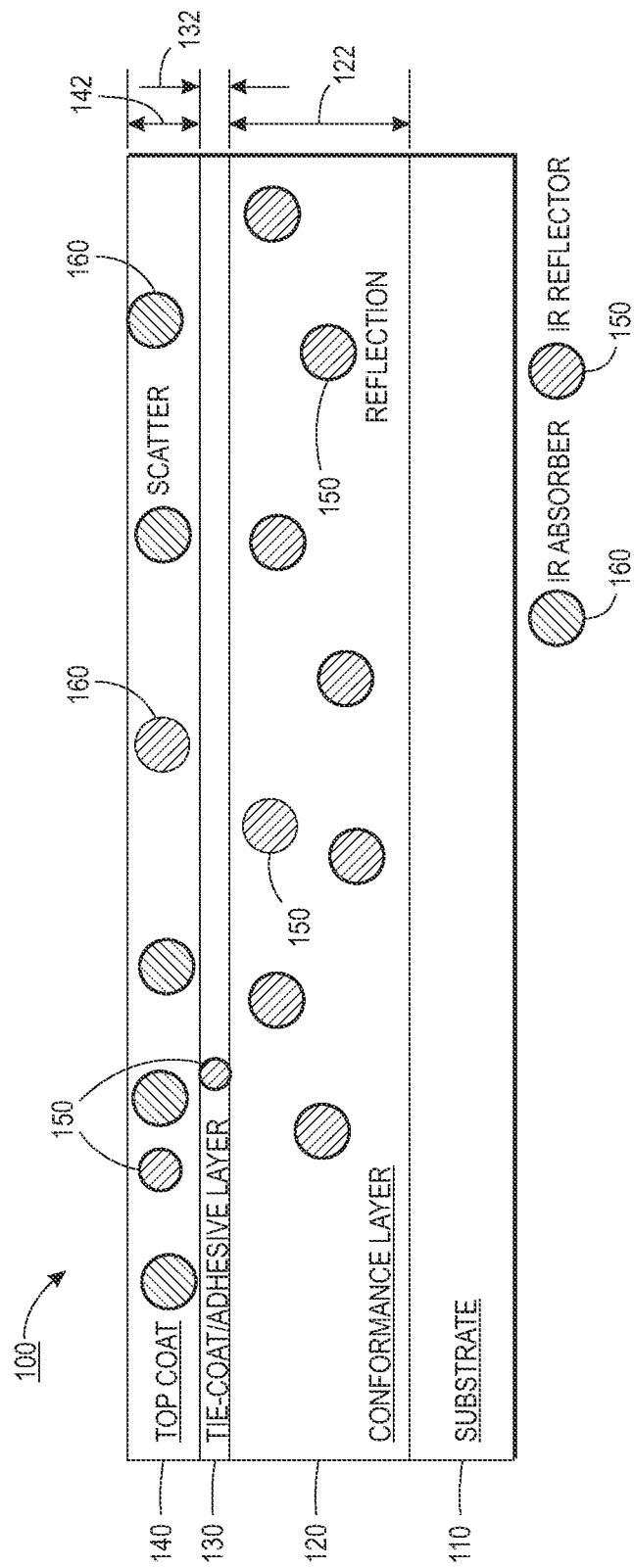
FIG. 1 depicts a schematic cross-sectional view of an illustrative transfix surface member for a printer, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

Transfix Surface Member

FIG. 1 depicts a schematic cross-sectional view of an illustrative transfix surface member 100 for a printer, according to an embodiment of the present disclosure. The transfix surface member 100 is described in the form of a blanket (also referred to herein as a "belt"), but can have various other forms, such as a roll.

The transfix surface member 100 may include a substrate 110. The base substrate can be a roll, belt or a plate mounted to a roll, as is well known in the art. The substrate 110 can be made of any suitable materials. Examples include polymers, such as polyimide, silicone or biaxially-oriented polyethylene terephthalate (e.g., MYLAR), metals such as aluminum or aluminum alloys, woven fabric, quartz or combinations thereof.

An optional conformance layer 120 may be disposed on the substrate 110. The conformance layer 120 may have a depth or thickness 122 ranging from about 200 μm to about 6000 μm, about 500 μm to about 4000 μm, or about 1000 μm to about 2000 μm. The conformance layer 120 may comprise a polymer. Examples of suitable polymers include silicone, a cross-linked silane, or a combination thereof.

The conformance layer 120 may also include one or more filler materials such as silica, alumina, iron oxide, carbon black, or a combination thereof. The filler materials may be present in the conformance layer 120 in an amount ranging from about 0.1 wt % to about 20 wt %, about 1 wt % to about 15 wt %, or about 2 wt % to about 10 wt %.

An optional adhesive layer 130 may be disposed on the conformance layer 120. The adhesive layer 130 may have a depth or thickness 132 ranging from about 0.05 μm to about 10 μm, about 0.25 μm to about 5 μm, or about 0.5 μm to about 2 μm. The adhesive layer 130 may be made from a silane, an epoxy silane, an amino silane adhesive, or a combination thereof. In another embodiment, the adhesive layer 130 may be made from a composite material. More particularly, the adhesive layer 130 may be made from or include a polymer matrix. The polymer matrix may be or include silicone, a cross-linked silane, or a combination thereof.

A topcoat layer (also referred to herein as a "surface layer") 140, may be disposed on the adhesive layer 130. If a conformance layer is not employed, than the topcoat layer can be disposed either directly on the substrate or on an adhesive layer that is directly on the substrate. The surface layer 140 comprises a fluoroelastomer-aminosilane grafted polymer composition. The composition is made by (i) mixing ingredients comprising a fluoroelastomer; an aminosilane; a solvent; and an infrared absorptive filler material to form a coating composition, (ii) depositing the coating composition onto the substrate; and (iii) curing the coating composition.

Any suitable fluoroelastomer can be employed. In an embodiment, the fluoroelastomer is a co-monomer that includes a vinylidene fluoride monomer unit and has substituent fluoro, alkyl, perfluoroalkyl, and/or perfuoroalkoxy groups on the polymer chain. The term copolymer here refers to polymers made from two or more monomers. In an embodiment, the fluorelastomers are categorized under the ASTM D1418, and have the ISO 1629 designation FKM. This class of elastomer is a family comprising copolymers that contains monomer units exclusively selected from the group consisting of hexafluoropropylene (HFP), tetrafluoroethylene (TFE), vinylidene fluoride (VDF), perfluoromethyl vinyl ether (PMVE), and ethylene (ET). In an embodiment, the fluoroelastomers may contain two or three or more of these monomers, and have a fluorine content of from about 60 wt % to about 70 wt %.

In an embodiment, the fluoroelastomer is a copolymer of vinylidene fluoride, hexafluoropropylene and tetrafluoroethylene. Exemplary commercially available fluoroelastomers include the TECNOFLON brand P959 from Solvay America, Inc. (Houston, Tex.) or as a VDF-TFE-HFP terpolymer under the DAI-EL brand G621 from Daikin Industries (Houston, Tex.).

The aminosilane is used as a crosslinker. Any suitable aminosilane that can provide the desired cross-linking of the fluoroelastomer may be employed. An exemplary aminosilane compound that can be reacted with the fluoroelastomer is an oxyaminosilane. The term "oxyaminosilane" refers to a compound that has at least one silicon atom covalently bonded to an oxygen atom and that has at least one amino group ($-NH_2$). The oxygen atom may be part of a hydrolyzable group, such as an alkoxy or hydroxyl group. The amino group is not necessarily covalently bonded to the silicon atom, but may be joined through a linking group. A general formula for an oxyaminosilane is provided in Formula (2):

$$Si(OR)_p R'_q (\text{-L-}NH_2)_{4-p-q} \quad \text{Formula (1)}$$

where R and R' can be the same or different and are selected from hydrogen or an alkyl; p is an integer from 1 to 3; q is an integer from 0 to 2; and L is a linking group, such as an alkylamine or alkyl linking group. More desirably, p is 2 or 3. The sum of 4−p−q must be at least 1. The term "alkoxy" refers to an alkyl radical (usually linear or branched) bonded to an oxygen atom, e.g. having the formula $-OC_n H_{2n+1}$.

In an embodiment, the oxyaminosilane is an amino substituted trialkoxysilane, such as a trimethoxysilane or a triethoxysilane. In an embodiment, the oxyaminosilane can be aminosubstituted dialkoxy-alkyl silanes, such as an aminosubstituted dimethoxy-methyl silane. Exemplary oxyaminosilanes include[3-(2-aminoethylamino)propyl]trimethoxysilane and 3-aminopropyl trimethoxysilane. In 3-aminopropyl trimethoxysilane, the propyl chain is the linking group. Such silanes are commercially available, for example from Sigma-Aldrich or UCT (sold as AO700). The amine functional group may be a primary, secondary, or tertiary amine. The nitrogen atom of an amino group can bond with the fluoroelastomer and thus, in at least some cases, the oxygen atom does not bond with the fluoroelastomer. Another group of the oxyaminosilane may be used to react with the fluorinated oxysilane-terminated compound.

In addition to the aminosilane crosslinker discussed above, the fluoroelastomer can optionally be co-crosslinked with an aminofunctionalized silane. The aminofunctionalized silane co-crosslinker can be used to tailor the surface properties of the fluoroelastomer. An example of a suitable aminofunctionalized silane crosslinker is shown below:

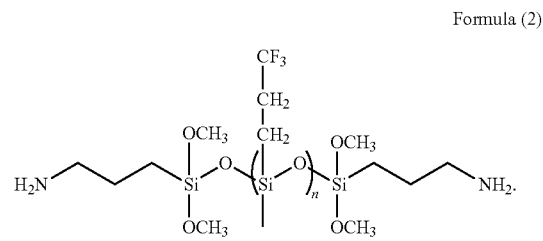

Formula (2)

An example of a commercial aminofunctionalized silane co-crosslinker is EF0712128, available from Wacker Silicones.

In an embodiment, a ratio of the aminosilane crosslinker of formula 1 to the aminofunctionalized silane of formula 2 is in a range from about 0.5:1 to about 3:1, or about 1:1 to about 2:1. In some embodiments, the ratio may be about 1.5:1.

One or more infrared absorptive filler materials 160 such as carbon black, graphene, carbon nanotubes, iron oxide, or a combination thereof, are included in the topcoat layer 140. As will be discussed in greater detail below, the infrared absorptive filler materials can reduce a temperature differential that can exist between different colored inks during radiative drying on the transfix surface member 100.

The infrared absorptive filler materials may be present in the topcoat layer 140 in an amount ranging from about 0.1 wt % to about 20 wt %, about 1 wt % to about 15 wt %, or about 2 wt % to about 10 wt %, relative to the total weight of the topcoat layer. Other examples include ranges of from about 1% by weight to about 5% by weight, or about 3% by weight, based on the total weight of the topcoat layer 140.

The topcoat layer 140 may further include one or more infrared reflective pigments 150. In another embodiment, the conformance layer 120, the adhesive layer 130, the topcoat layer 140, or a combination thereof may include the reflective pigments 150. The reflective pigments 150 in the topcoat layer 130 may be the same as the reflective pigments 150 in the conformance layer 120 and/or the adhesive layer 130, or they may be different. For example, the reflective pigments 150 in the topcoat layer 140 may be or include titanium dioxide, nickel rutile, chromium rutile, cobalt-based spinel, chromium oxide, chrome iron nickel black spinel, or a combination thereof. The reflective pigments 150 may be present in the topcoat layer 140 in an amount ranging from about 0.1 wt % to about 20 wt %, about 1 wt % to about 15 wt %, or about 2 wt % to about 10 wt %.

The incorporation of the reflective pigments 150 into the topcoat layer 140 may improve the reflection of radiant energy back into the ink for absorption by the ink components for improved and/or enhanced ink drying. When the reflective pigments 150 are combined in the topcoat layer 140 with the absorptive materials 160, such as carbon black, the efficiency of photothermal conversion may be enhanced relative to carbon black alone. Further, the differential rate of drying among different ink colors may be reduced or eliminated. The amount of radiant energy waste may be reduced, and the efficiency of the ink drying may improve.

The topcoat layer 140 can have any desired thickness. As an example, the topcoat layer 140 may have a depth or thickness 142 ranging from about 5 μm to about 100 μm, about 10 μm to about 75 μm, or about 20 μm to about 50 μm.

The topcoat layer 140 of the present disclosure can be made by any suitable polymerization process. For example, a desired amount of infrared absorptive filler can be well mixed with the fluoroelastomer and a suitable solvent. The aminosilane dissolved in a solvent can then be added to the fluoroelastomer/filler mixture in an amount sufficient to provide the desired cross linking during the curing process. Catalysts can optionally be employed to promote polymerization and/or cross-linking during curing. In embodiments, an amount of the aminofunctionalized silane is in a range from about 2 pph to about 10 pph, relative to the fluoroelastomer. After mixing the aminosilane and fluoroelastomer/filler mixtures, the resulting liquid coating formulation can be coated onto a suitable substrate and cured, as discussed in greater detail below. The crosslinked coating prepared according to the instant disclosure can withstand high temperature conditions without melting or degradation, is mechanically robust under such conditions and provides good wettability.

Solvents used for processing of precursors and coating of layers include organic hydrocarbon solvents, alcohols such as methanol, ethanol, isopropanol, and n-butanol and fluorinated solvents. Further examples of solvents include ketones such as methyl ethyl ketone, and methyl isobutyl ketone ("MIBK"). Mixtures of solvents may be used. In embodiments, the solvent may be present in an amount of at least 20 weight percent of the formulation composition, such as from about 20 weight percent to about 90 weight percent, or from about 50 weight percent to about 80 weight percent of the formulation composition.

The liquid coating compositions formed can include any suitable amount of coating precursors and solvent. In an embodiment, solids loading of the composition can range from about 10 weight percent to about 80 weight percent, such as from about 18 or 20 weight percent to about 70 weight percent, or from about 40 weight percent to about 60 weight percent.

In embodiments, the liquid coating formulation may be applied to a substrate using any suitable liquid deposition technique. Exemplary methods for depositing the coating solution on the substrate include draw-down coating, spray coating, spin coating, flow coating, dipping, spraying such as by multiple spray applications of very fine thin films, casting, web-coating, roll-coating, extrusion molding, laminating, or the like. The thickness of the coating solution may be from about 100 nm to about 200 μm, such as from about 500 nm to about 100 μm, or from about 20 μm to about 50 μm.

Following coating of the liquid formulation onto a substrate, a cured film may be formed upon standing or from drying with heat treatment. The curing processes according to the instant disclosure may be carried out at any suitable temperature, such as from about 80° C. to about 200° C., or from about 100° C. to about 180° C., or from about 120° C. to about 160° C. The curing process can occur for any suitable length of time to provide the desired cross-linking and removal of solvent.

The top coat layer 140 can be tailored to best support the requirements of the aqueous transfix process in which the top coat layer is employed. For example, the top coat layer can have properties that both promote uniform wetting (good-spread) of a sacrificial layer (sometimes referred to as a "skin"), which is discussed in detail below, as well as supply enough release to ensure the sacrificial layer/ink image is transferred efficiently to the final print media. Further, the topcoat layer can absorb the radiant energy from the drying lamps to compensate for any differences in ink absorption. That is, uniform heating of the larger thermal mass top coat layer can act to equilibrate differences in ink temperature. Improvements in ink temperature uniformity may provide improved color-to-color transfer consistency in an aqueous transfix printing process.

Printer Employing Transfix Member

Figure 2:
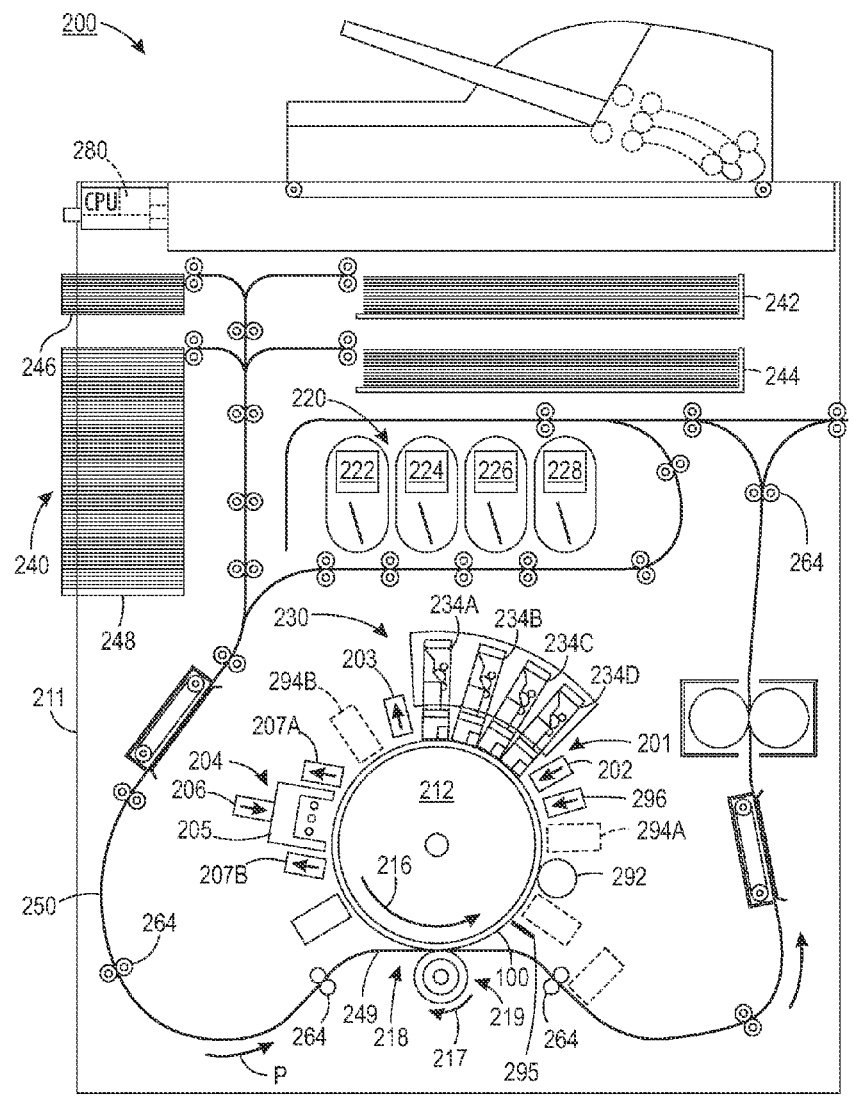
FIG. 2 illustrates a printer including a transfix surface member, according to an embodiment of the present disclosure.

FIG. 2 depicts a printer 200 including the transfix surface member 100, according to an embodiment of the present disclosure. The printer 200 may be an indirect aqueous inkjet printer that forms an ink image on a surface of the transfix surface member 100. Examples of aqueous inkjet printers are described in more detail in U.S. patent application Ser. No. 14/032,945, filed Sep. 20, 2013, and U.S. patent application Ser. No. 14/105,498, filed Dec. 13, 2013, the disclosures of both of which are herein incorporated by reference in their entireties.

The printer 200 includes a frame 211 that supports operating subsystems and components, which are described below. The printer 200 includes an intermediate transfer member, which is illustrated as comprising a rotating imaging drum 212 and a transfix surface member 100. In an embodiment, the transfix surface member 100 is in the form of a blanket that is manufactured separately and then mounted about the circumference of the drum 212. In another embodiment, the transfix surface member 100 is coated directly onto the intermediate transfer member so as to form an integral outer surface thereof. In this embodiment, the substrate 110 of the transfer member may be a surface of the drum 212 or a roll on which the transfix surface member 100 is to be coated.

The transfix surface member 100 may move in a direction 216 as the drum 212 rotates. The transfix roller 219 may rotate in the direction 217 and be loaded against the surface of transfix surface member 100 to form the transfix nip 218, within which ink images formed on the surface of transfix surface member 100 are transfixed onto a print medium 249. In some embodiments, a heater (not shown) in the drum 212 or in another location of the printer heats the transfix surface member 100 to a temperature in a range of, for example, approximately 50° C. to approximately 120° C. The elevated temperature promotes partial drying of the liquid carrier that is used to deposit the hydrophilic sacrificial coating composition and the water in the aqueous ink drops that are deposited on the transfix surface member 100.

A cleaning unit, such as a blade 295, may remove residual ink left on the surface of the transfix surface member 100 after the ink images are transferred to the print medium 249. A surface maintenance unit ("SMU") 292 may include a coating applicator, such as a donor roller (not shown), which is partially submerged in a reservoir (not shown) that holds the hydrophilic sacrificial coating composition in a liquid carrier. The donor roller may draw the liquid sacrificial coating composition from the reservoir and deposit a layer of the sacrificial coating composition on the transfix surface member 100. After a drying process, which can be carried out, for example, by a dryer 296, the dried sacrificial coating may substantially cover a surface of the transfix surface member 100 before the printer 200 ejects ink drops during a print process.

The printer 200 may also include an aqueous ink supply and delivery subsystem 220 that has at least one source 222 of one color of aqueous ink. In an embodiment, the printer 200 is a multicolor image producing machine, the ink delivery system 220 including, for example, four (4) sources 222, 224, 226, 228, representing four (4) different colors CYMK (cyan, yellow, magenta, black) of aqueous inks.

A printhead system 230 may include a printhead support, which provides support for a plurality of printhead modules, also known as print box units, 234A-234D. Each printhead module 234A-234D effectively extends across a width of the transfix surface member 100 and ejects ink drops onto the transfix surface member 100. A printhead module 234A-234D may include a single printhead or a plurality of printheads configured in a staggered arrangement. The printhead modules 234A-234D may include associated electronics, ink reservoirs, and ink conduits to supply ink to the one or more printheads, as would be understood by one of ordinary skill in the art.

After the printed image on the transfix surface member 100 exits the print zone, the image passes under an image dryer 204. The image dryer 204 may include a heater 205, such as a radiant infrared heater, a radiant near infrared heater, and/or a forced hot air convection heater. The image dryer 204 may also include a dryer 206, which is illustrated as a heated air source, and air returns 207A and 207B. The heater 205 may apply, for example, infrared heat to the printed image on the surface of the transfix surface member 100 to evaporate water and/or solvent in the ink. The heated air source 206 may direct heated air over the ink to supplement the evaporation of the water and/or solvent from the ink. In an embodiment, the dryer 206 may be a heated air source with the same design as the dryer 296. While the dryer 296 may be positioned along the process direction to dry the hydrophilic sacrificial coating, the dryer 206 may also be positioned along the process direction after the printhead modules 234A-234D to at least partially dry the aqueous ink on the transfix surface member 100. The air may then be collected and evacuated by air returns 207A and 207B to reduce the interference of the air flow with other components in the printing area.

The printer 200 may further include a print medium supply and handling system 240 that stores, for example, one or more stacks of paper print mediums of various sizes, as well as various other components useful for handling and transferring the print medium. While example handling and transfer components are illustrated at 242, 244, 246, 250 and 264, any suitable supply and handling system can be employed, as would be readily understood by one of ordinary skill in the art. Operation and control of the various subsystems, components, and functions of the printer 200 may be performed with the aid of the controller 280. In an embodiment, the controller 280 may be the main multi-tasking processor for operating and controlling all of the other machine subsystems and functions.

Once an image or images have been formed on the transfix surface member 100 and sacrificial coating, components within the printer 200 may operate to perform a process for transferring and fixing the image or images from the transfix surface member 100 to media. For example, heat and/or pressure can be applied by the transfix roller 219 to the back side of the heated print medium 249 to facilitate the transfixing (transfer and fixing) of the image from the intermediate transfer member onto the print medium 249. In an embodiment, the sacrificial coating is also transferred from the intermediate transfer member to the print medium 249 as part of the transfixing process.

After the intermediate transfer member moves through the transfix nip 218, the image receiving surface passes a cleaning unit that can remove any residual portions of the sacrificial coating and small amounts of residual ink from the image receiving surface of the transfix surface member 100.

As used herein, unless otherwise specified, the word "printer" encompasses any apparatus that performs a print outputting function for any purpose, such as a digital copier, bookmaking machine, facsimile machine, a multi-function machine, electrostatographic device, etc.

Specific examples will now be described in detail. These examples are intended to be illustrative, and not limited to the materials, conditions, or process parameters set forth in these embodiments. All parts are percentages by solid weight unless otherwise indicated.

EXAMPLES

Example 1

Formulation and Flow Coating of Topcoat with Carbon Black

Figure 3:
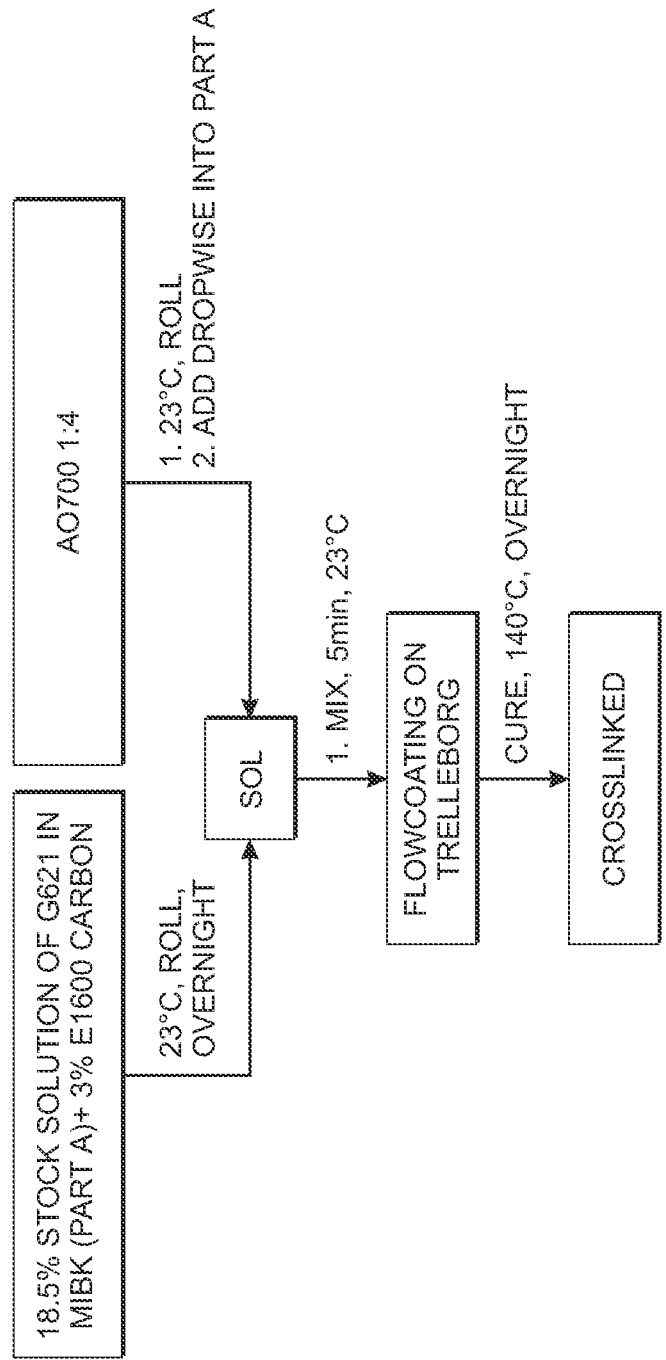
FIG. 3 illustrates an example process for making a coating composition of the present disclosure.

In a typical process, a 18.5% solution was made by dissolving vinylidene fluoride/hexafluorine propylene/tetrafluorine ethylene terpolymer flouroelastomer, commercially available as G-621 from Daikin, in MIBK (Part A, FIG. 3). Part A consists of very low amount of surfactant, which gives good compatibility between the fluoroelastomer with the release layer/oil applied on a fuser and can help prevent pin holes/fish eye defects. The surfactant was a mixture of 3M FC-4430 and Wacker AKF290, in an amount of approximately 0.5 wt % of each relative to the solids portion of the formulation. Part A was then mixed with 20 pph of carbon black EMPEROR 1600 and shaken with a paint shaker in the presence of steel beads for at least 3 hours. The EMPEROR 1600 carbon black was chosen because it can be easily solution processed and can be uniformly dispersed in the polymer, which provides for a smooth surface coating. The dispersion was made by shaking in a container with steel beads or steel shot. The steel media was filtered out of the formulation after shaking. In Part B (FIG. 3), an amino crosslinker AO700, a [3-(2-aminoethylamino)propyl]trimethoxysilane compound available from United Chemical Technologies, was mixed with a mass ratio of 1:4 in MIBK to prepare a 40% solution. Part B was then added into Part A drop-wise while stirring the dispersion with a mechanical stirrer. Once the addition of Part B to Part A was complete, the resulting solution was flow coated onto an offset printing blanket made by Trelleborg of Trelleborg, Sweden. The coating was cured at 140° C.

Example 2

Formulation and Flow Coating of Topcoat without Carbon Black

To make coatings without carbon black, the above procedure of Example 1 was followed except that no carbon black was added and dispersed with steel media.

Example 3

Temperature Measurements

Temperature measurements were taken of cyan, magenta and black inks printed onto an intermediate transfix member during operation of an aqueous transfix printer. Aqueous transfix printers employing fluoroelastomer-aminosilane grafted polymer blankets with and without carbon black were tested. For the fluoroelastomer-aminosilane grafted polymer coating without carbon black, temperature measurements of the ink taken post-drying but pre-transfer of the ink image showed relatively large temperature differences for the different color inks. Data collected during the testing showed the cyan and magenta ink temperatures were much cooler than the black ink temperatures, with minimum and maximum temperatures across a coated blanket varying by as much as about 15° C. to over 30° C., depending on the length of time the inks had been exposed to radiation heating during the process. On the other hand, for the fluoroelastomer-aminosilane grafted polymer coating with carbon black, the same measurements showed similar heating for all colors, with minimum and maximum temperature differences measured across the blanket varying by only about 5° C. or less.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An indirect printing apparatus comprising:
   an intermediate transfer member, comprising:
      a substrate; and
      a surface layer disposed over the substrate, the surface layer comprising a fluoroelastomer-aminosilane grafted polymer and infrared absorptive filler materials, an aminosilane unit of the fluoroelastomer-aminosilane grafted polymer being an oxyaminosilane;
   a coating mechanism for forming a sacrificial coating onto the intermediate transfer member;
   a drying station for drying the sacrificial coating;
   at least one ink jet nozzle positioned proximate the intermediate transfer member and configured for jetting ink droplets onto the sacrificial coating formed on the intermediate transfer member;
   an ink processing station comprising a radiation source for at least partially drying the ink on the sacrificial coating formed on the intermediate transfer member; and
   a substrate transfer mechanism for moving a substrate into contact with the intermediate transfer member.

2. The indirect printing apparatus of claim 1, wherein a fluoroelastomer unit of the fluoroelastomer-aminosilane grafted polymer contains two or more monomer units exclusively selected from the group consisting of hexafluoropropylene (HFP), tetrafluoroethylene (TFE), vinylidene fluoride (VDF), perfluoromethyl vinyl ether (PMVE) and ethylene (ET).

3. The indirect printing apparatus of claim 1, wherein the aminosilane unit of the fluoroelastomer-aminosilane grafted polymer is an aminosubstituted trialkoxysilane unit.

4. The indirect printing apparatus of claim 1, wherein the infrared absorptive filler materials are carbon black and the amount of carbon black ranges from about 1% by weight to about 5% by weight, based on the total weight of the surface layer.

5. The indirect printing apparatus of claim 1, further comprising two or more of the ink jet nozzles, each nozzle configured for jetting a different colored ink droplet onto the sacrificial coating formed on the intermediate transfer member.

6. An indirect printing apparatus comprising:
   an intermediate transfer member, comprising:
      a substrate; and
      a surface layer disposed over the substrate, the surface layer comprising a fluoroelastomer-aminosilane grafted polymer and infrared absorptive filler materials, an aminosilane unit of the fluoroelastomer-aminosilane grafted polymer being an oxyaminosilane;
   a coating mechanism for forming a sacrificial coating onto the intermediate transfer member;
   a drying station for drying the sacrificial coating;
   at least one ink jet nozzle positioned proximate the intermediate transfer member and configured for jetting ink droplets onto the sacrificial coating formed on the intermediate transfer member;
   an ink processing station comprising a radiation source for at least partially drying the ink on the sacrificial coating formed on the intermediate transfer member; and
   a substrate transfer mechanism for moving a substrate into contact with the intermediate transfer member,
   wherein the drying station is positioned between the coating mechanism and the at least one ink jet nozzle so as to be capable of drying the sacrificial coating before the ink droplets are jetted onto the sacrificial coating during printing.

7. The indirect printing apparatus of claim 6, wherein the fluoroelastomer unit of the fluoroelastomer-aminosilane grafted polymer contains two or more monomer units exclusively selected from the group consisting of hexafluoropropylene (HFP), tetrafluoroethylene (TFE), vinylidene fluoride (VDF), perfluoromethyl vinyl ether (PMVE) and ethylene (ET).

8. The indirect printing apparatus of claim 7, wherein the aminosilane unit of the fluoroelastomer-aminosilane grafted polymer is an aminosubstituted trialkoxysilane unit.

9. The indirect printing apparatus of claim 6, wherein the infrared absorptive filler materials are carbon black and the amount of carbon black ranges from about 1% by weight to about 5% by weight, based on the total weight of the surface layer.

10. An indirect printing apparatus comprising:
   an intermediate transfer member, comprising:
      a substrate; and
      a surface layer disposed over the substrate, the surface layer comprising a fluoroelastomer-aminosilane grafted polymer and infrared absorptive filler materials;
   a coating mechanism for forming a sacrificial coating onto the intermediate transfer member;
   a drying station for drying the sacrificial coating;
   at least one ink jet nozzle positioned proximate the intermediate transfer member and configured for jetting ink droplets onto the sacrificial coating formed on the intermediate transfer member;
   an ink processing station comprising a radiation source for at least partially drying the ink on the sacrificial coating formed on the intermediate transfer member; and
   a substrate transfer mechanism for moving a substrate into contact with the intermediate transfer member,
   wherein the drying station is positioned between the coating mechanism and the at least one ink jet nozzle so as to be capable of drying the sacrificial coating before the ink droplets are jetted onto the sacrificial coating during printing,
   further comprising a conformance layer disposed between the substrate layer and the surface layer.

11. The indirect printing apparatus of claim 10, wherein the fluoroelastomer unit of the fluoroelastomer-aminosilane grafted polymer contains two or more monomer units exclusively selected from the group consisting of hexafluoropropylene (HFP), tetrafluoroethylene (TFE), vinylidene fluoride (VDF), perfluoromethyl vinyl ether (PMVE) and ethylene (ET).

12. The indirect printing apparatus of claim 10, wherein the aminosilane unit of the fluoroelastomer-aminosilane grafted polymer is an aminosubstituted trialkoxysilane unit.

13. The indirect printing apparatus of claim 10, wherein the infrared absorptive filler materials are carbon black and the amount of carbon black ranges from about 1% by weight to about 5% by weight, based on the total weight of the surface layer.

* * * * *